(12) United States Patent
Tsuchiya et al.

(10) Patent No.: US 6,433,961 B1
(45) Date of Patent: Aug. 13, 2002

(54) MAGNETIC HEAD CLEANER

(75) Inventors: Manabu Tsuchiya; Koji Fujita, both of Yamagata (JP)

(73) Assignee: NEC Corporation, Tokyo (JP)

( * ) Notice: Subject to any disclaimer, the term of this patent is extended or adjusted under 35 U.S.C. 154(b) by 23 days.

(21) Appl. No.: 09/669,564

(22) Filed: Sep. 26, 2000

(30) Foreign Application Priority Data

Sep. 27, 1999 (JP) .......................................... 11/242564

(51) Int. Cl.[7] ................................................ G11B 5/41
(52) U.S. Cl. ....................................................... 360/128
(58) Field of Search ................................. 360/128, 122, 360/69, 84, 85, 95, 137; 15/DIG. 12, DIG. 13; 242/352.4, 348, 348.3, 332.2

(56) References Cited

U.S. PATENT DOCUMENTS

| | | | | |
|---|---|---|---|---|
| 3,964,104 A | * | 6/1976 | Herron et al. ............... | 360/128 |
| 4,941,140 A | * | 7/1990 | Ono et al. ................... | 369/264 |
| 5,252,739 A | * | 10/1993 | Yamashita et al. .......... | 546/250 |
| 5,309,307 A | * | 5/1994 | Fritsch et al. ............... | 360/128 |
| 5,710,684 A | * | 1/1998 | Inoue et al. ................. | 360/128 |
| 5,793,580 A | * | 8/1998 | Argumedo et al. .......... | 360/128 |
| 6,067,211 A | * | 5/2000 | Chliwnyj et al. ............ | 360/128 |
| 6,208,488 B1 | * | 3/2001 | Yamakawa et al. ......... | 360/128 |
| 6,212,036 B1 | * | 4/2001 | Todd et al. .................. | 360/128 |
| 6,252,739 B1 | * | 6/2001 | Todd et al. .................. | 360/128 |

* cited by examiner

*Primary Examiner*—Allen Cao
*Assistant Examiner*—Dzung C. Nguyen
(74) *Attorney, Agent, or Firm*—Sughrue Mion, PLLC (57) ABSTRACT

In a magnetic head cleaner (4) for use in a magnetic recording/reproducing apparatus having a magnetic head (61) located in the neighborhood of the center of gravity of a head driving mechanism (62), an arm (41) which is retractably swung along the front face of the magnetic head (61) is provided with a holder (45) for enabling a cleaner head (48) to perform a contact/separate operation to/from the front face of the magnetic head (61), the holder (45) being operated so that the cleaner head (48) comes into contact with the front face of the magnetic head (61) when the arm (41) is located in front of the front face of the magnetic head (61), and being guided so as to be separated from the magnetic head (61) by guide means (7) provided to a frame (1) of the apparatus at the stage that the arm (41) is retracted from the front face of the magnetic head (61).

8 Claims, 9 Drawing Sheets

MAGNETIC HEAD CLEANER

BACKGROUND OF THE INVENTION

1. Field of the Invention

The present invention relates to a magnetic head cleaner having an arm which is equipped with a cleaner head and is retractably swung along the front face of a magnetic head, the cleaner head being slid in contact with the front face of the magnetic head when the magnetic head is cleaned.

2. Description of the Related Art

In this type of magnetic head cleaner, a cleaning work is carried out by operating a cleaner head such as a brush or the like in front of the magnetic head, and it is necessary to keep the cleaner head far away from a magnetic tape (recording medium) disposed on the front face of the magnetic head when a magnetic recording/reproducing operation is carried out.

An arm on which the cleaner head is mounted is designed to be movable along the front face of the magnetic head, and, when the arm is retracted it is guided to the front portion of a magnetic head actuator (head driving mechanism) on which the magnetic head is disposed. Usually, the actuator is disposed below the magnetic head so as to extend beyond the front face of the magnetic head in order to stabilize the head operation and the alignment of the magnetic head in a head driving operation by locating the magnetic head in the neighborhood of the center of gravity of the actuator.

Therefore, the arm of the magnetic head cleaner is located to be shifted to the front side of the frame of the magnetic recording/reproducing apparatus because it is required to avoid the extending portion of the actuator when being swung, and thus the cleaner head supporting site of the arm is located far away from the magnetic head. This lowers the wiping action (the cleaning efficiency) of the cleaner in the cleaning operation.

SUMMARY OF THE INVENTION

The present invention has been implemented under the above-mentioned circumstances, and has an object to provide a magnetic head cleaner for a magnetic recording/reproducing apparatus in which a magnetic head is located in the neighborhood of the center of gravity of a head driving mechanism, in which a holder for the cleaner head is controlled to move toward the front face of the magnetic head when the magnetic head is cleaned and move far away from the front face of the magnetic head when it is retracted, thereby achieving a sufficient wiping action (high cleaning efficiency).

In order to attain the above object, according to the present invention, a magnetic head cleaner having an arm which is equipped with a cleaner head and is retractably swung along the front face of a magnetic head, the cleaner head being slid in contact with the front face of the magnetic head when the magnetic head is cleaned, is characterized in that the arm has a holder of enabling the cleaner head to perform a contact/separate operation to/from the front face of the magnetic head, the holder being operated so that the cleaner head comes into contact with the front face of the magnetic head when the arm is located at the front face of the magnetic head, and being guided so as to be separated from the magnetic head by guide means provided to a frame of a magnetic recording/reproducing apparatus at the stage that the arm is retracted from the front face of the magnetic head.

In this case, it is more effective that the holder is pivotally mounted on the arm, the guide means functions to rotate the holder when the guide means guides the holder, the holder is elastically supported on the arm to urge the cleaner head toward the front face of the magnetic head when a cleaning operation is carried out, the arm has a cam which is guided by a bearing movable along the guide of the apparatus frame, and the bearing presses the cam to swing the arm.

According to the present invention, the cleaning work can be performed on the magnetic head with a high wiping efficiency. In addition, after the cleaning work, the cleaner head (brush) and the holder therefor are separated from the magnetic head, and the arm of the magnetic head cleaner for moving the holder can be retracted without interfering in other constituent parts such as the driving mechanism of the magnetic head, etc.

DETAILED DESCRIPTION OF THE PREFERRED EMBODIMENTS

Preferred embodiments according to the present invention will be described hereunder with reference to the accompanying drawings.

Figure 1:
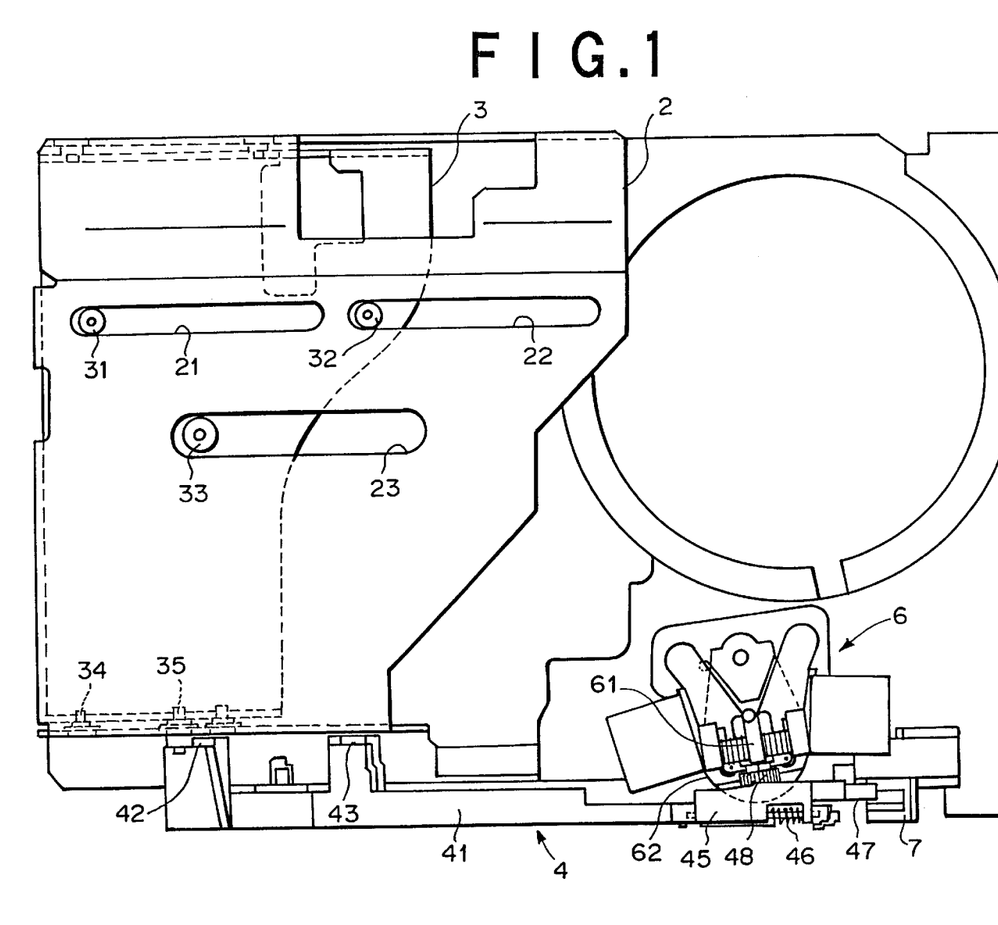
FIG. 1 is a plan view showing an embodiment of the magnetic recording/reproducing apparatus having a magnetic head cleaner of the present invention.
Figure 2:
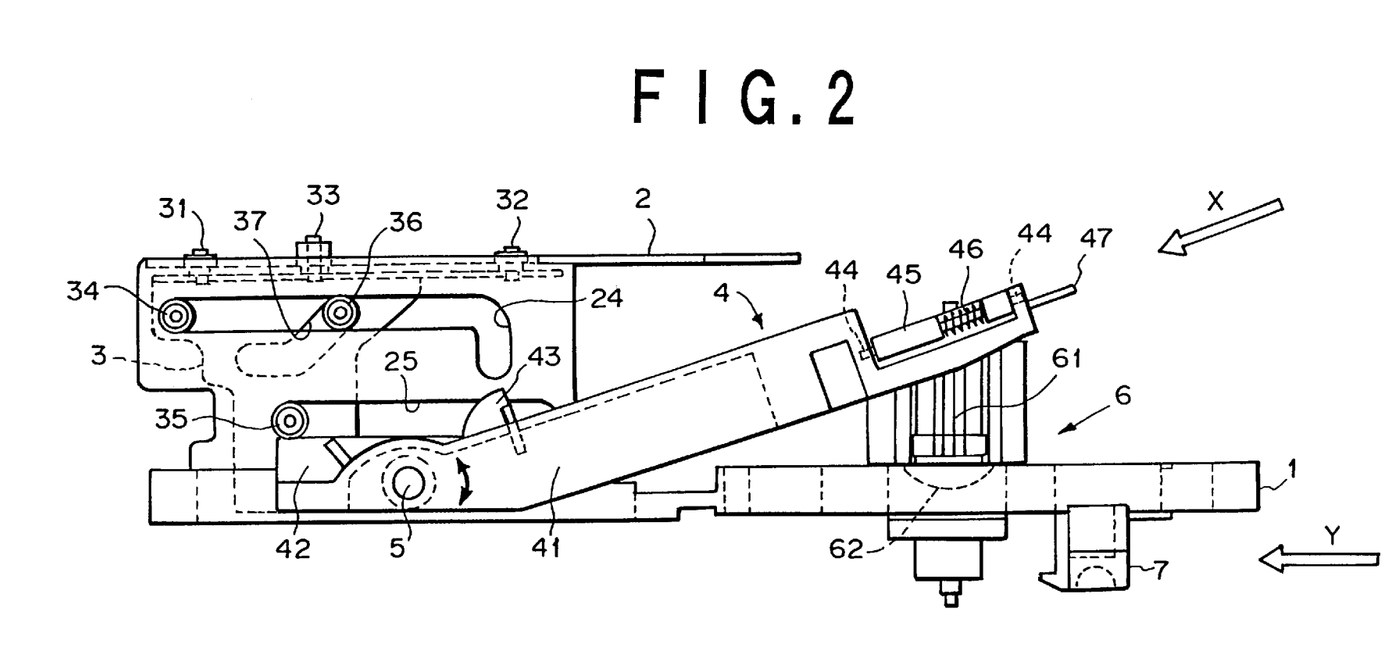
FIG. 2 is a front view showing the magnetic recording/reproducing apparatus having the magnetic head cleaner of the present invention.

In an embodiment of the magnetic head cleaner of the present invention, a magnetic head cleaner 4 is rotatably or pivotally secured through a pin 5 to the front side face of a deck base (apparatus frame) 1 as shown in FIG. 2 so as to perform a swing motion. Through the swing motion of the magnetic head cleaner 4, a cleaner head 48 such as a brush or the like which is secured to the tip of an arm 41 cleans a magnetic head 61. The present invention is characterized by the operation of a brush holder 45 after the front face of the magnetic head 61 of a magnetic head unit 6 is cleaned.

Figure 3A:
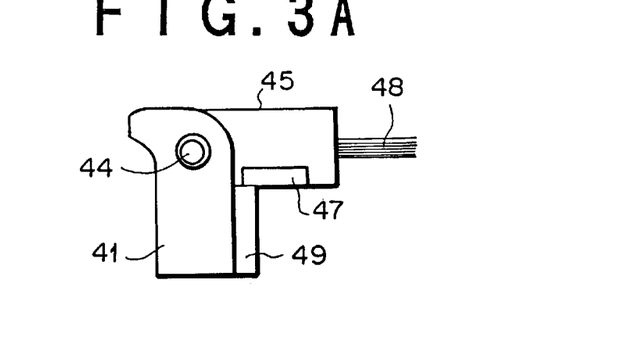
FIGS. 3A and 3B are end views showing the magnetic head cleaner of the present invention.
Figure 3B:
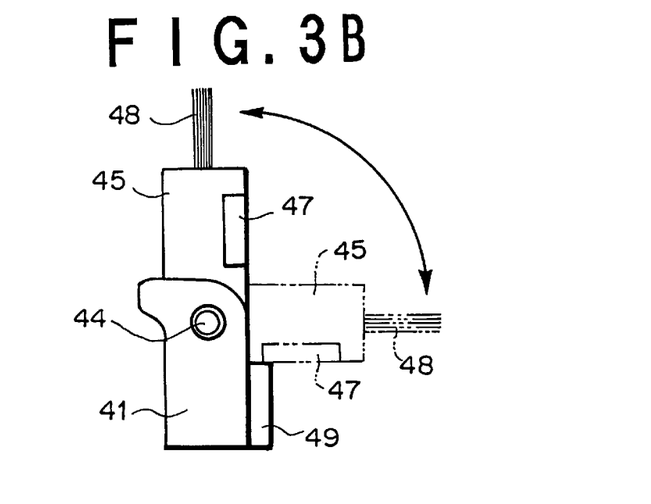

As shown in FIGS. 1 to 4, the brush holder 45 is passed through the front face side of the magnetic head 61, and then kept far away at a long distance from the front face of the magnetic head 61 on the basis of a rotating mechanism as shown in FIGS. 3A and 3B, when the brush holder 45 is retracted (unused). With this construction, a magnetic head actuator (magnetic head driving mechanism) 62 can be located so as to extend beyond the front face of the magnetic head 61, and thus the center of the applying force of the actuator 62 and the center of gravity of the magnetic head 61 can be made coincident with each other, so that the stability of head operation and alignment in the head driving operation can be facilitated.

More specifically, the magnetic head cleaner 4 comprises an arm 41, a cam 42, a cam 43, a pin 44, a brush holder 45, a twisted spring 46 for elastically urging the brush holder 45 in a clockwise direction around the pin 44 as viewed from the X direction of FIG. 2 (that is, in FIGS. 3A and 3B), a guide plate 47, a brush (cleaner head) 48 and a stopper 49 provided at the tip of the arm 41. The brush holder 45 is secured through the pin 44 to the tip of the arm 41 which is rotatably or pivotally mounted through the pin 5 on the front side surface of the deck base 1, and the brush (cleaner head) 48 is affixed to the side surface of the brush holder 45.

The brush holder 45 is fixed to the arm 41 through the pin 44, and the twisted spring 46 is affixed between the brush holder 45 and the arm 41 so that the brush holder 45 is urged in clockwise direction as viewed from the X direction of FIG. 2 (that is, in FIGS. 3A and 3B), and it is pressed against the stopper 49 by the twisted spring 46, whereby the brush 48 is directed to the front face of the magnetic head 61. The cams 42, 43 are provided in the neighborhood of the rotational shaft (pin 5) of the arm 41, and the contact of the bearing 35 with these cams enables the arm 41 to perform a swing motion.

The bearing 35 and other bearings 31 to 34 provided to a loader plate 3 for loading the apparatus with a cassette or cartridge of a magnetic recording medium are guided in a horizontal direction by a guide slit 25 and guide slits 21 to 24 respectively which are provided to a loader guide (bracket) 2 of the apparatus frame side. Loading force is applied to the bearing 33. A bearing 36 is provided to a cartridge tray (not shown), and it extends through the guide slit 24 and a guide slit 37 formed in the loader plate 3.

The brush holder 45 is provided with a plate-shaped brush guide 47 which is nearer to the magnetic head unit 6 side than the pin 44, and the brush guide 47 abuts against the stopper 49 when the twisted spring 46 causes the urging motion of the brush holder 45.

Figure 4:
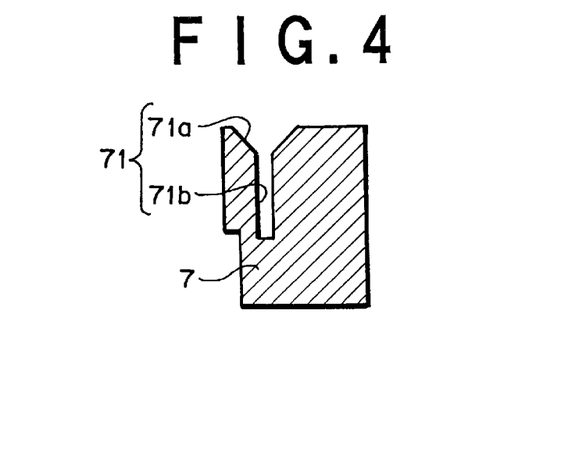
FIG. 4 is a cross-sectional view showing a guide member of the magnetic head cleaner of the present invention.

A retracting guide 7 for the brush 48 which corresponds to the brush guide 47 is located at one side of the actuator 62 and at the front portion of the deck base 1. The retracting guide 7 has a guide slot 71 comprising a slant portion 71a and a vertical portion 71b as shown in FIG. 4 which is a cross-sectional view of the retracting guide 7 taken in a plane perpendicular to the Y direction of FIG. 2. The retracting guide 7 abuts against the brush guide 47 and rotates the holder 45 around the pin 44 as shown in FIGS. 3B, 7, 8, 9A and 9B (that is, rotates the holder 45 in a counterclockwise direction against the urging force of the spring 46 as shown in FIG. 3B).

Figure 5:
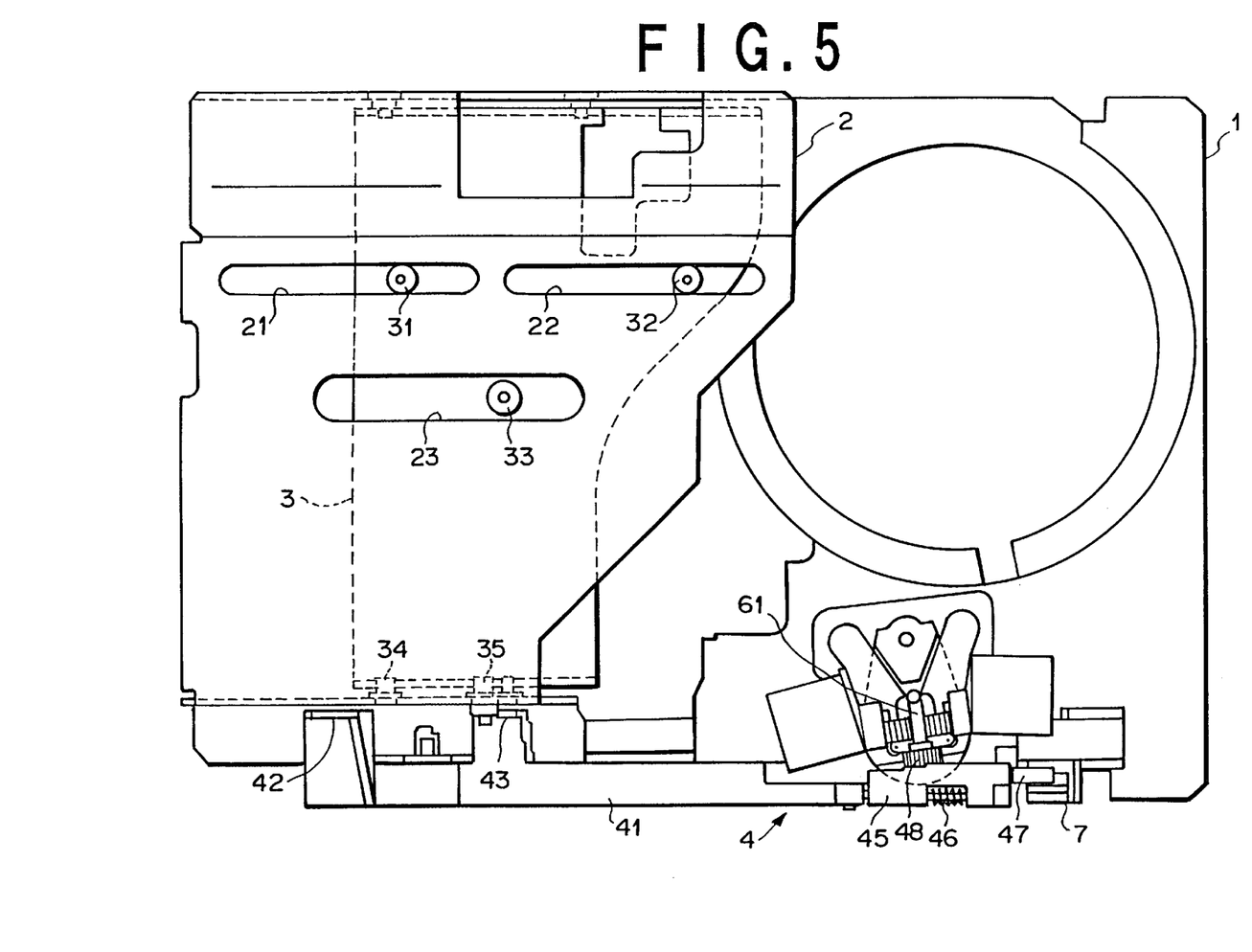
FIG. 5 is a plan view showing the magnetic recording/reproducing apparatus having the magnetic head cleaner of the present invention at a state that cleaning (wiping) is finished.
Figure 6:
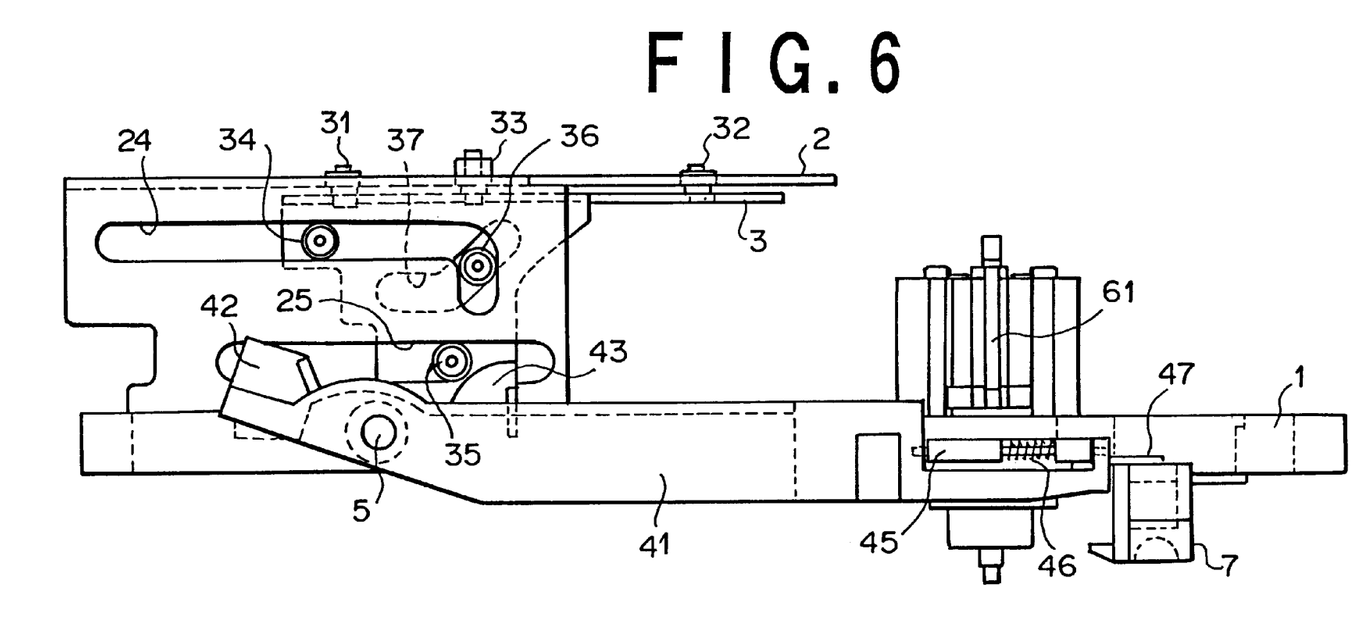
FIG. 6 is a front view showing the magnetic recording/reproducing apparatus having the magnetic head cleaner of the present invention at the state that cleaning (wiping) is finished.
Figure 7:
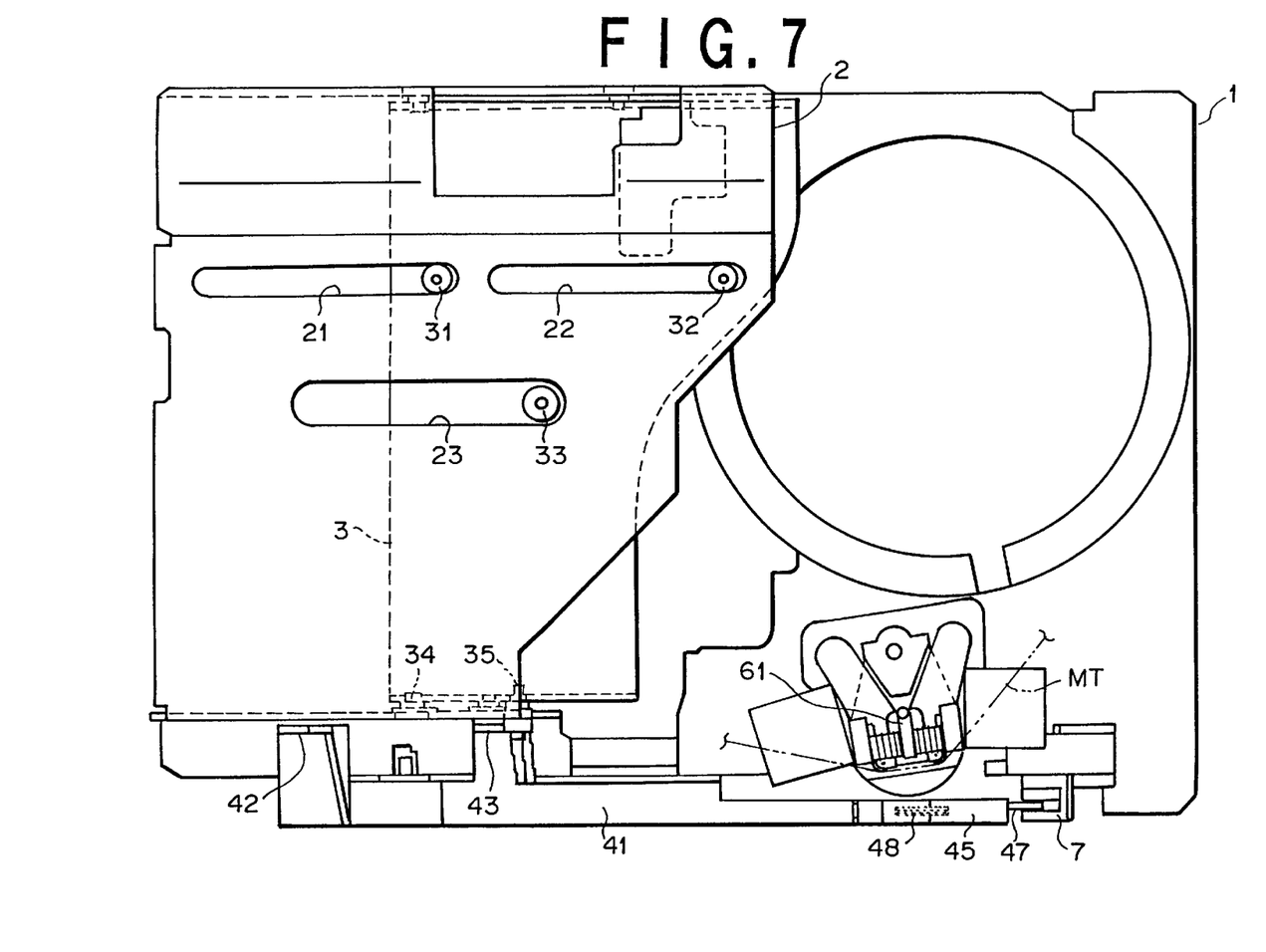
FIG. 7 is a plan view showing the magnetic recording/reproducing apparatus having the magnetic head cleaner of the present invention at a state that an arm is retracted.

At this time, the brush guide 47 is guided to a slant portion 71a and then a vertical portion 71b. As a result, the brush holder 45 is rotated from a cleaning position as shown in FIGS. 1, 2, 3A, 5 and 6 by 90 degrees to place the brush 48 face up, and is separated from the magnetic head 61 so as to be far away from the magnetic head 61. This state is shown in FIGS. 3B, 7 and 8.

In this embodiment, the magnetic head cleaner 4 for cleaning the front face of the magnetic head positioned on the magnetic head actuator 62 of the magnetic head unit 6 of a magnetic recording/reproducing apparatus comprises: the arm 41 having a proximal portion and a distal portion, the proximal portion being pivotally mounted by means of the pin 5 on the frame 1 of the apparatus, the distal portion being swung along the front face of the magnetic head 61; the cleaner head 48; the holder 45 for supporting the cleaner head, the holder 45 being pivotally mounted by means of the pin 44 on the distal portion of the arm 41 under the urging force applied thereto in the first rotational direction; the stopper 49 provided to the arm, which holds the holder 45 against the above urging force to maintain the cleaner head 48 in the first position, i.e. horizontally directed position, for cleaning the magnetic head 61; the abutting member 47 provided to the holder, which is disposed at a position separated from the rotational axis (pin 44) of the holder 45; and, the guide member 7 attached to the frame, which is disposed on the passage route of the abutting member 47 when the above distal portion is swung, wherein the guide member 7 guides the abutting member 47 when the distal portion is retracted from the front face of the magnetic head 61 so that the holder 45 is rotated in the second rotational direction against the above urging force to maintain the cleaner head 48 in the second position, i.e. vertically directed position, for retraction from the magnetic head 61. The magnetic head cleaner 4 further comprises the cams 42, 43 provided to the arm 41 at the neighborhood of the above proximal portion, which is engaged with the bearing 35 movable along a guide slit 25 provided to the magnetic tape cartridge loading means of the apparatus so as to cause rotation of the arm 41. The above urging force is applied to the holder 45 by the twisted spring 46 disposed around the rotational axis of the holder. The cleaner head 48 is a brush.

With the above construction, the loader plate 3 is moved from the left side (initial state in FIGS. 1, 2) to the right side by a certain driving mechanism (not shown) through the bearing 33 to load the apparatus with the magnetic tape cassette or cartridge at the predetermined position. In this case, the bearing 35 presses the cam 43 provided to the arm 41 to rotate the arm 41 around the pin 5 and wipe the front face of the magnetic head 61 by the brush 48 while the bearings 31 to 35 are shifted from the state of FIGS. 1, 2 to the state of FIGS. 5, 6 in the guide slits 21 to 25 provided to the loader guide 2. After the wiping work, the brush 48 is retracted from the front face of the magnetic head 61 as described above (as shown in FIGS. 7, 8), and moved down to the front side of the actuator 62. Accordingly, the brush holder 45 can be accommodated in compact size into the guide vertical portion 71b of the guide 7 while guided by the slant portion 71a. FIG. 9A shows the relationship between the cleaner head holder 45 and the guide member 7 in the state of FIGS. 5, 6, and FIG. 9B shows the relationship between the cleaner head holder 45 and the guide member 7 in the state of FIGS. 7, 8.

Figure 8:
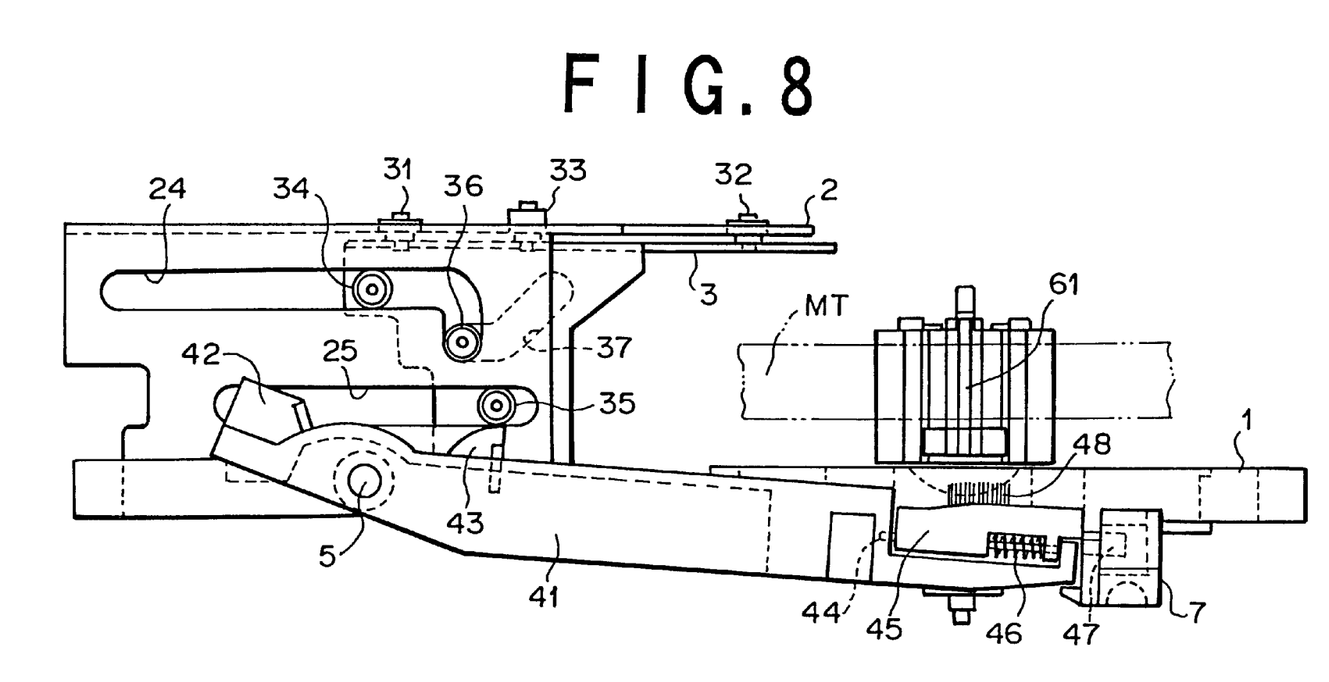
FIG. 8 is a front view showing the magnetic recording/reproducing apparatus having the magnetic head cleaner of the present invention at a state that the arm is retracted.
Figure 9A:
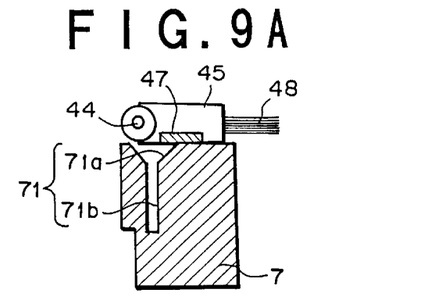
FIGS. 9A and 9B show a relationship between a cleaner head holder and a guide member.
Figure 9B:
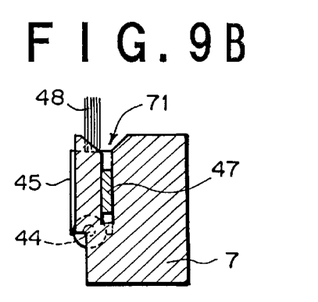

In the state of FIGS. 8, 9, the bearing 36 is lowered to the lowermost position, and thus the cartridge retained in the cartridge tray is ready for tape threading operation. In FIGS. 8, 9, the magnetic tape MT threaded so as to pass through on the front face of the magnetic head 61 is described.

When the magnetic head 61 is wiped again, the bearing 35 is operated by moving the loader plate 3 from the right side to the left side to press the cam 42 to rotate the arm 41, whereby the arm 41 is returned to the initial state. During this process, the spring 46 works and the brush guide 47 is rotated until it abuts against the stopper 49 (see FIGS. 5, 6), whereby the brush holder 45 is returned to the horizontal state (see FIG. 3A) and the brush 48 is returned to the position at which it is slidable in contact with the front face of the magnetic head 61.

Figure 10:
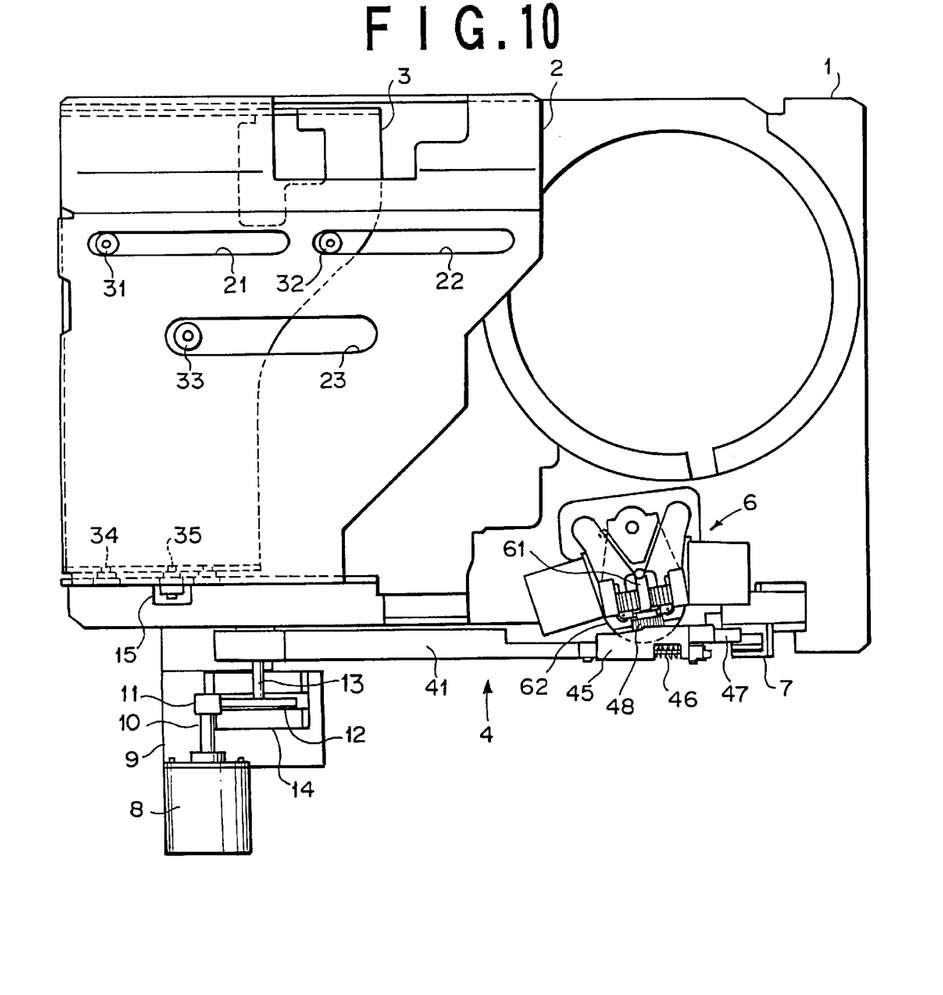
FIG. 10 is a plan view showing another embodiment of the magnetic recording/reproducing apparatus having a magnetic head cleaner of the present invention.
Figures 11, 12:
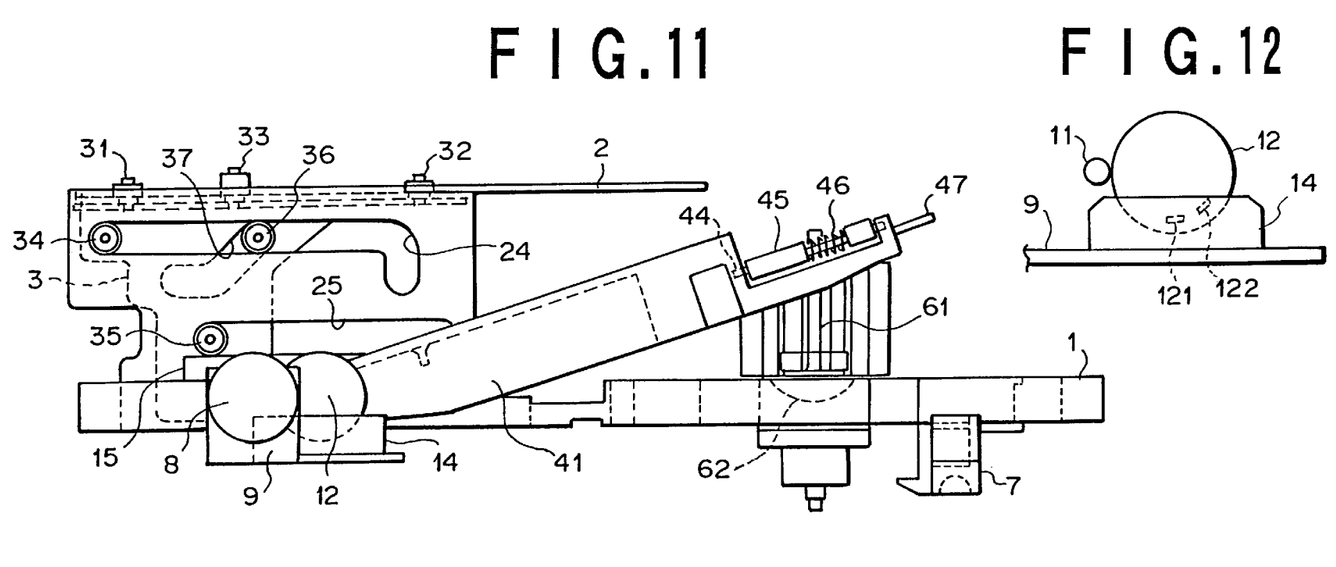
FIG. 11 is a front view showing the magnetic recording/reproducing apparatus having the magnetic head cleaner of the present invention.
FIG. 12 is a front view showing a sensor in the magnetic head cleaner of the present invention.

FIGS. 10 to 12 show another embodiment of the magnetic head cleaner of the present invention, in which the loader plate 3 is operated in the right-and-left direction of the deck base 1 when a cassette is loaded, and separately from this operation, the arm 41 and the magnetic head cleaner 4 are driven by a motor 8.

More specifically, the motor 8 is fixed to a bracket 9 provided at the front portion of the deck base 1, and the motor driving force is transmitted to the arm 41 by a gear 11 provided to the tip of a motor shaft 10 and a gear 12 provided to the tip of a cleaner shaft 13 (corresponding to the pin 5 of the aforementioned embodiment) mounted to the arm 41.

The gear 12 is provided with slits 121 and 122. The slit 121 is provided so as to be detected by a sensor 14 fixed to the bracket 9 when the arm 41 is upwardly moved at the maximum (see FIG. 11). Further, the slit 122 is provided so as to be detected by the sensor 14 when the arm 41 is downwardly moved at maximum (not shown). A sensor 15 is provided on the deck base 1, and it serves to detect the position of the bearing 35 of the loader plate 3.

With this construction, the motor 8 is rotated only when the bearing 35 is detected by the sensor 15, whereby the arm 41 of the magnetic head cleaner 4 is rotated through the gears 11, 12 to perform the cleaning work.

In the operation flow, the motor 8 is first rotated in the clockwise direction to clean the magnetic head 61 while the arm 41 is upwardly moved, and the motor 8 is stopped at the time when the slit 121 is detected by the sensor 14 (see FIG. 11). Thereafter, the motor 8 is counterclockwise rotated to clean the magnetic head 61 while the arm 41 is downwardly moved, and the motor 8 is stopped at the time when the slit 122 is detected by the sensor 14.

In this embodiment, the magnetic head cleaner 4 is driven by the motor 8, and thus the magnetic head 61 can be cleaned at many times during the time period for which the bearing 35 is detected by the sensor 15 because the magnetic head cleaner 4 is driven by the motor 8. Therefore, the cleaning operation on the magnetic head 61 can be performed with high wiping efficiency.

What is claimed is:

1. A magnetic head cleaner which is installed in a magnetic recording/reproducing apparatus provided with a magnetic head, having an arm which is equipped with a cleaner head and is retractably swung along the front face of the magnetic head, the cleaner head being slid in contact with the front face of the magnetic head when the magnetic head is cleaned, characterized in that said arm has a holder of enabling said cleaner head to perform a contact/separate operation to/from the front face of the magnetic head, said holder being operated so that said cleaner head comes into contact with the front face of said magnetic head when the arm is located in front of the front face of the magnetic head, and being guided so as to be separated from the magnetic head by guide means provided to a frame of the apparatus at the stage that said arm is retracted from the front face of the magnetic head.

2. The magnetic head cleaner as claimed in claim 1, wherein said holder is pivotally mounted on said arm, and said guide means has a function of rotating said holder when carrying out a guide operation.

3. The magnetic head cleaner as claimed in claim 2, wherein said holder is elastically supported on said arm so as to urge said cleaner head toward the front face of the magnetic head when a cleaning operation is carried out.

4. The magnetic head cleaner as claimed in claim 1, wherein said arm has a cam which is guided by a bearing movable along a guide slit of the apparatus, and said bearing presses said cam to swing said arm.

5. A magnetic head cleaner for cleaning a front face of a magnetic head of a magnetic recording/reproducing apparatus, comprising:

an arm having a proximal portion and a distal portion, said proximal portion being pivotally mounted on a frame of said apparatus, said distal portion being swung along the front face of the magnetic head;

a cleaner head;

a holder for supporting said cleaner head, said holder being pivotally mounted on said distal portion of the arm under an urging force applied thereto in a first rotational direction;

a stopper provided to said arm, which holds said holder against said urging force to maintain said cleaner head in a first position for cleaning the magnetic head;

an abutting member provided to said holder, which is disposed at a position separated from a rotational axis of the holder; and, a guide member attached to said frame, which is disposed on a passage route of said abutting member when said distal portion is swung, wherein said guide member guides said abutting member when the distal portion is retracted from the front face of the magnetic head, whereby said holder is rotated in a second rotational direction against said urging force to maintain said cleaner head in a second position for retraction from the magnetic head.

6. The magnetic head cleaner as claimed in claim 5, further comprising a cam provided to said arm at a neighborhood of said proximal portion, which is engaged with a bearing movable along a guide slit provided to a magnetic tape cartridge loading means of the apparatus so as to cause rotation of said arm.

7. The magnetic head cleaner as claimed in claim 5, wherein said urging force is applied to said holder by a twisted spring disposed around said rotational axis of the holder.

8. The magnetic head cleaner as claimed in claim 5, wherein said cleaner head is a brush.

* * * * *

UNITED STATES PATENT AND TRADEMARK OFFICE
CERTIFICATE OF CORRECTION

PATENT NO. : 6,433,961 B1
DATED : August 13, 2002
INVENTOR(S) : Manabu Tsuchiya and Koji Fujita It is certified that error appears in the above-identified patent and that said Letters Patent is hereby corrected as shown below:

<u>Title page,</u>
Please delete Priority Data "11/242564" and insert -- 11-272564 --

Signed and Sealed this

Thirty-first Day of December, 2002

JAMES E. ROGAN
*Director of the United States Patent and Trademark Office*